United States Patent
Patten, Jr. et al.

(10) Patent No.: US 11,775,757 B2
(45) Date of Patent: Oct. 3, 2023

(54) AUTOMATED MACHINE-LEARNING DATASET PREPARATION

(71) Applicant: International Business Machines Corporation, Armonk, NY (US)

(72) Inventors: Willie Robert Patten, Jr., Hurdle Mills, NC (US); Eugene Irving Kelton, Mechanicsburg, PA (US); Arvin Bhatnagar, Cary, NC (US); Jason Howard Cornpropst, Raleigh, NC (US); Jacob McPherson, Franklinton, NC (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 16/865,621

(22) Filed: May 4, 2020

(65) Prior Publication Data

US 2021/0342640 A1 Nov. 4, 2021

(51) Int. Cl.
*G06F 40/279* (2020.01)
*G06N 20/00* (2019.01)
*G06F 40/205* (2020.01)
*G06F 16/901* (2019.01)
*G06F 18/214* (2023.01)
*G06F 18/21* (2023.01)

(52) U.S. Cl.
CPC ........ *G06F 40/279* (2020.01); *G06F 16/9024* (2019.01); *G06F 18/2148* (2023.01); *G06F 18/2193* (2023.01); *G06F 40/205* (2020.01); *G06N 20/00* (2019.01)

(58) Field of Classification Search
CPC ... G06K 9/6257; G06F 40/279; G06F 16/902; G06N 20/007
USPC .............................. 709/46; 706/46
See application file for complete search history.

(56) References Cited

U.S. PATENT DOCUMENTS

| | | | |
|---|---|---|---|
| 6,636,870 B2 | 10/2003 | Roccaforte | |
| 9,928,289 B2 | 3/2018 | Bi | |
| 10,026,041 B2 | 7/2018 | Narayanan et al. | |
| 2010/0131457 A1 | 5/2010 | Teimendinger | |
| 2012/0185275 A1* | 7/2012 | Loghmani | G06Q 40/08 705/3 |
| 2016/0124722 A1 | 5/2016 | Mathew et al. | |
| 2017/0091220 A1 | 3/2017 | Wu et al. | |
| 2018/0307710 A1 | 10/2018 | Dai et al. | |
| 2019/0073348 A1* | 3/2019 | Cheesman | G06V 30/412 |
| 2019/0340283 A1* | 11/2019 | Schneider | G06F 16/258 |

FOREIGN PATENT DOCUMENTS

| | | |
|---|---|---|
| CN | 108510082 A | 9/2018 |
| CN | 110704840 A | 1/2020 |

* cited by examiner

*Primary Examiner* — Sibte H Bukhari
(74) *Attorney, Agent, or Firm* — Rachel M. Yadlosky

(57) ABSTRACT

A method of preparing a dataset may comprise calculating a pattern relevance for a first field in the dataset and modifying the first field based on the pattern relevance. The method may further comprise detecting a contextual cue in the first field. The method may further comprise retrieving contextual information for a value in the first field and adding that contextual information to the database. Finally, the method may further comprise identifying a numerical scheme for the first field and parsing the first field into a number according to that numerical scheme.

20 Claims, 8 Drawing Sheets

ID
AUTOMATED MACHINE-LEARNING DATASET PREPARATION

BACKGROUND

The present disclosure relates to machine-learning models, and more specifically, to preparing data for ingestion by machine-learning models.

Machine-learning models, such as neural networks and other artificial-intelligence systems, are useful to for identifying patterns in large datasets. With proper training and enough data, machine-learning models are often capable of associating these identified patterns with target phenomena, such as fraudulent activity, speech patterns, and natural phenomena. Machine-learning models are sometimes used to analyze datasets with many fields and parameters to detect these phenomena, due to the machine-learning models' ability to identify patterns within aspects of the dataset that a human may overlook as unrelated.

The format of data inserted into a machine-learning model can vary based on the requirements of the model. However, most machine-learning models require data to be flat (e.g., a single row of fields) rather than formatted in a two-dimensional grid or in a list with a nested structure. Thus, datasets are typically prepared for ingestion before input into the machine-learning model.

Before a typical machine-learning model can be used to analyze data associated with a target phenomenon, the machine-learning model must typically be trained on that type of data. Training a machine-learning model typically requires a large dataset (sometimes referred to herein as "training data") to be run through the model in order to teach the model which patterns are associated with the target phenomena. This large dataset typically also requires preparation for ingestion.

SUMMARY

Some embodiments of the present disclosure can be illustrated as a method of preparing a dataset for ingestion by a machine-learning model. The method comprises calculating a pattern relevance for a first field in the dataset and modifying the first field based on the pattern relevance. The method further comprises detecting a contextual cue in the first field. The method further comprises retrieving contextual information for a value in the first field and adding the contextual information to the dataset. Finally, the method comprises identifying a numerical scheme for the first field and parsing the first field into a number according to that numerical scheme.

Some embodiments of the present disclosure can also be illustrated as a system comprising a processor and a memory in communication with the processor, the memory containing program instructions that, when executed by the processor, are configured to cause the processor to perform the above method of preparing a dataset for ingestion by a machine-learning model.

Some embodiments of the present disclosure can also be illustrated as a computer program product comprising a computer readable storage medium having program instructions embodied therewith, the program instructions executable by a computer to cause the computer to prepare a dataset for ingestion by a machine-learning model by a process similar to the above method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
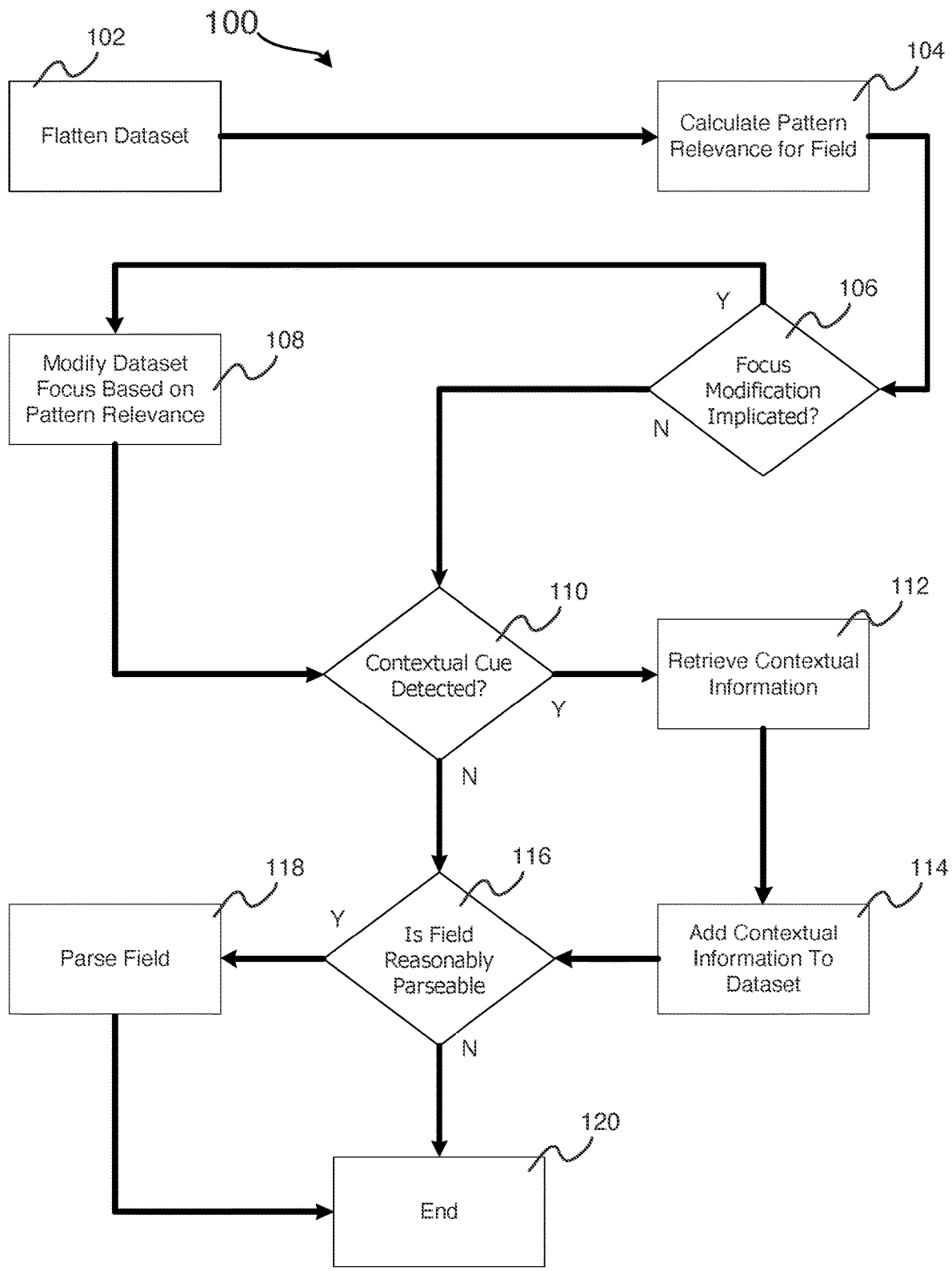
FIG. 1 depicts an example method of preparing a dataset field for ingestion into a machine-learning model, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to machine-learning models, and more specifically, to preparing data for ingestion by machine-learning models. While the present disclosure is not necessarily limited to such applications, various aspects of the disclosure may be appreciated through a discussion of various examples using this context.

Machine-learning models, such as neural networks and other artificial-intelligence systems (sometimes referred to herein as "ML models" or "models") are often used to analyze large sets of data, recognize patterns in that data, and associate those patterns with an outcome, activity, or other phenomenon (sometimes referred to herein as a "target phenomenon"). In order for a typical machine-learning model to associate a recognized pattern with a target phenomenon, the model must be trained to do so using training data. The training process typically involves the machine-learning model repeatedly ingesting historical data that has been selected to train the model. This historical data, referred to herein as "training data," is selected based on a similarity to the data that is expected to be input into the ML model when the model is completed. For example, a model that is expected to associate patterns in weather measurements with imminent natural disasters may be trained on historical weather data. Once a model is trained to associate data patterns with a target phenomenon, the model can be used to detect or predict the target phenomenon by inputting live data to the model. If the model recognizes one of the associated patterns in the live data, the model can output a detection or prediction that the data implicates the presence of the target phenomenon.

Because the data patterns that machine-learning models may learn to associate with target phenomenon may be rare and complex, the typical machine-learning model may require a large amount of data to be trained and to analyze at runtime. In some use cases, machine-learning models may be most useful when they are trained to analyze far more data than a human reviewer would think is relevant, because the machine-learning model may then be trained to more accurately recognize patterns that a human reviewer would not consider looking for. Thus, for machine-learning models to be accurately trained and operated, they require large datasets for analysis.

The data provided to train or operate a machine-learning model is oftentimes gathered or stored for other purposes. For example, some machine-learning models may be trained to associate patterns in a record of financial transactions with fraudulent activity. These models may receive data that originated from a bank's or company's logs that are formatted for audit purposes. Similarly, a model that is trained to associate patterns in personal records with suspected identify theft may analyze address histories or HR records of employees. These records may be stored in a format, such as JavaScript Object Notation (referred to herein as "JSON") or extensible markup language (referred to herein as "XML"), that is optimized for human readability, data transfer, or non-machine-learning software applications. In these formats, data is typically presented in a very nested, structured, organized fashion, enabling a human reader to quickly glean context about the data from the organization of the data rather than solely from the data itself. Further, nesting specific data under broad categories often results in normalization of duplicate data, making usability easier and overall file size of the dataset smaller.

Unfortunately, these human-readable formats are not usable in typical machine-learning models. Rather, typical ML models require data to be presented in a very specific but simplistic format. For example, most machine-learning models ingest data in the form of 1-dimensional matrixes of discrete data values (these 1-dimensional matrixes sometimes referred to herein as "vectors"). In other words, ML models ingest data in the form of a single row of many columns, wherein each column in the row represents a data field and contains a discrete data value.

To address some of the above issues, some methods do exist to remove the nested, human-readable structure of datasets. These methods are commonly referred to as flattening, because the methods aim to transform the dataset from a nested structure to a flat structure in which all data is organized in flat rows. In a flattened dataset, each row may contain the data for a single entry. For example, in a flattened dataset that lists discrete bank transactions, each bank transaction (i.e., each entry) may have a dedicated row that contains all the values (e.g., transaction ID, bank name, transaction date) associated with that bank transaction. These values may be distributed into fields in the rows. In a typical dataset, each entry contains the same amount of fields, though the values in the fields can vary from entry to entry.

However, common flattening methods are used to prepare datasets for a wide variety of applications, rather than solely ML models. Some of these applications may still require some degree of human readability. As a result, the output of most flattening methods are typically not specialized for machine-learning model readability. Thus, even data sets for which flattening methods perfectly remove nested structures still require further processing to prepare the dataset for ingestion by a machine-learning model.

For example, many machine-learning models require data to be entered in numerical format, and sometimes even in binary format (i.e., limited to 1 s and 0 s). Thus, even if the human-readable structure of a dataset is removed, the non-numerical format (sometimes referred to herein as string format) of some data in the dataset may still prevent a machine-learning model from effectively processing the data. The typical flattened dataset also contains data that is not useful for pattern recognition, such as data labels, data that does not vary within the dataset, and data that does not repeat within the dataset. Further, flattened datasets often lack context for data that may be useful or necessary for pattern recognition, because the contextual information that may enable a model to associate data patterns with a target phenomenon may not be useful for the purpose for which the data was originally collected.

Unfortunately, the process of preparing a flattened data dataset for ingestion is currently a manual process that can be both time consuming and expensive. For this reason, dataset preparation is often truncated in order to save time or money, which can create detrimental effects on the resulting analysis of the dataset.

For example, in order to convert human-readable language to a model-readable form such as a numerical form (a process referred to herein as "parsing" the data), a developer of a ML model (also referred to herein as a "modeler"), typically reviews each field of the data set to identify fields that are not in numerical format (i.e., a string field). When the developer identifies a string field, the developer must analyze the field in order to identify a numerical scheme into which the field could be transformed. For example, the developer may determine how many unique strings are in the field in the dataset to determine whether the strings could be numbered, or if a more complex transformation would be necessary.

Once all string fields are identified and numerical schemes for all fields that can reasonably be transformed are created, the developer must then typically also write machine code to point to each field to be converted and that is capable of converting the values within the field in the dataset. Understandably, this can be a very time-consuming process for the model developer, which is exacerbated by the large, varied datasets that are often used to train and operate ML models.

Similarly, and as previously discussed, machine-learning model developer may optimize a dataset by reducing or eliminating data that is not useful for pattern recognition and by adding contextual information to the data. However, this optimization process also requires manual investment on the part of the machine-learning developer. Again, both processes currently involve the developer analyzing each field of the dataset, sometimes compared to other fields, to determine whether optimization of the field would improve pattern-recognition accuracy. Further, reducing useless data and adding contextual information must either be manually performed, or the developer must create code that can optimize specified fields. However, both these options are also time consuming, leading to a high cost for optimizing a dataset.

For the above reasons, prepping an entire data set for ingestion, particularly when optimizing the dataset as well as flattening and parsing it, is often prohibitively expensive, time consuming, or both. Thus, data sets are often culled before preparation or optimization. This is oftentimes performed at the direction of, or based on the advice of, a domain subject matter expert (sometimes referred to herein as a "domain SME"). For example, a domain SME, such as an expert in financial crimes or insurance fraud, may advise a modeler to focus on particular areas of the data set pertaining to financial transactions or insurance claims. The domain SME may advise the modeler to focus on particular fields or sets of fields and to delete some others. Unfortunately, this can have unintended, but significant, negative effects on the ability of the ML model to accurately recognize useful patterns within the data and associate those patterns with a target phenomenon. This is because, as previously discussed, machine-learning models are often designed to, and can excel at, associating target phenomena with data patterns that a human (e.g., a domain SME or modeler) would not consider as relevant for review.

Thus, a data scientist may not identify data for inclusion in the prepared data set that that the data scientist believes to be irrelevant to the target phenomenon. However, that identified data, if analyzed by the ML model, may help to identify a pattern that is directly correlated with the target phenomenon. This may occur even assuming that a data scientist has complete understanding of what data could lead to useful pattern recognition and what data could not, because the data may still be required to significantly cull the data set for budgetary reasons.

For example, a data scientist may be given a budget of $10,000 for prepping a data set for analysis. If prepping all the data that may be relevant would cost $20,000, however, the data scientist may be forced to remove some data from preparation, even if the data scientist realizes that the removed data may increase the accuracy of the trained ML model.

For all of the above reasons, the costs and time associated with the typical methods of preparing datasets for ingestion by a machine-learning model often require sacrifices in the amount of that a dataset is prepared and in the amount that the dataset is optimized, or both. This can cause the analysis of the ML model to return results that are sometimes inaccurate, sometimes incomplete, and sometimes unusable. This can result not only in wasting the time and money that was spent in preparing training and live data sets, but also the time and money required to perform the inaccurate analysis.

To address some of the issues identified above, some embodiments of the present disclosure provide a method, computer program product, and system that automatically prepares and optimizes a dataset for ML model digestion. Some embodiments may include, for example, automatically predicting the likelihood that a field or set of fields in the dataset would be useful for pattern recognition and correlating those patterns to a target phenomenon. This likelihood may be referred to as the "pattern relevance" for the field or fields. Once the pattern relevance for a field is predicted, embodiments of the present disclosure may prepare the dataset by transforming the fields based on the pattern relevance. This transformation may be referred to herein as modifying the "focus" of the dataset, and may include deleting some fields from the dataset (sometimes referred to as "feature selection"), merging multiple fields together, or removing portions of a field that do not differ from other fields (e.g., labels).

For example, some embodiments may calculate the variance of a field. The variance of a field may express the amount that the values of that field changes throughout the dataset. In other words, it expresses the extent to which the fields differ from each other. For example, a field (e.g., transaction ID) for which the values of every single entry are different would have an extremely high variance, but a field (e.g., country of residence) in which 50% of entries are a first value (e.g., Canada) and 50% of the entries are a second value (e.g., United States) would have lower variance. Further, a field for which all but one entry is a first value and for which and the one entry is a second data value would have extremely low variance, and a field for which all entries are the same would have no variance.

Once the variance for a field is calculated, it may be compared to one or more variance thresholds. For example, a low variance threshold may be used to identify fields that have low variance (e.g., fields for which all entries have the same data). These fields may not be useful in correlating data patterns with a target phenomenon because entries that exhibit the target phenomenon and entries that do not exhibit the target phenomenon would both share the pattern. For this reason, modifying the focus of the dataset may include removing these fields (e.g., in a feature-selection process).

Similarly, a high variance threshold may be used to identify fields that have very high variance (e.g., fields for which all entries have different data). These fields may not be useful in correlating data patterns with a target phenomenon because no entries that exhibit the target phenomenon would share the same value for the field. For this reason, modifying the focus of a dataset may also include removing these fields (i.e., selecting against these features). However, in some complex pattern-recognition models, patterns may be recognized where values of fields between entries are within a certain range of each other, or where values of fields in the same entry are related. Thus, in some embodiments a high variance threshold may not be utilized. In other embodiments, focus modifications resulting from a field crossing a high variance threshold may be overridden by other pattern-relevance considerations.

For example, in some embodiments calculating the pattern relevance for a field may include determining whether that field is somehow linked to another field in some entries. For example, one field of an entry may be linked to another field of the entry if a high percentage of entries contain the same value for the two fields, or if a high percentage of entries contain a value of one field that is X % higher than the value of another field, or if the value of one field is always Y when the value of a second field is Z. In any of these examples, the two fields may be referred to as "linked." In a dataset in which some entries contain linked fields and some entries do not, the presence of absence of linked fields may itself be a pattern that may be relevant to a target phenomenon. Some embodiments or use cases may require the prevalence of a linking pattern to be higher or lower in order for two fields to be considered "linked." For example, in some embodiments a linking pattern may only be considered relevant if it is present in at least 50% of entries, and thus any fields that exhibit linking patterns in less than 50% of the entries may not be considered "linked."

A modification to the dataset's focus based on two fields being linked may depend on the linking pattern. For example, if every entry in a dataset exhibited the same linking pattern for two fields (e.g., if field 1 is A, then field 2 is B, but if field 1 is X, then field 2 is Y), then those two fields may be merged for all entries. However, if only some of the entries exhibited the pattern, the fields may only be merged for those entries. Alternatively, the fields may not be merged for any entries, but a new field may be added that expresses whether the entry exhibits the linking pattern.

Some embodiments of the present disclosure may also automatically identify fields for which added contextual information may be of use in pattern recognition. For example, some embodiments may automatically determine the data type for a field based on the form of the values in the field or other information. Some fields may be identified as expressing calendar dates, timestamps, physical addresses, physical measurements, unique IDs, phone numbers, or others. Some embodiments of the present disclosure may utilize algorithms that can analyze the format of the values of the fields in the dataset and determine whether the field is a particular data type or another.

Once the data type for a field is known, some embodiments of the present disclosure may determine whether there are contextual cues present based on the data type. For example, a field that expresses dates may imply a contextual cue that knowing the day of the week of that date may be relevant for pattern recognition. Similarly, knowing whether the date was a holiday, or what the weather was like on that date may also be relevant for pattern recognition. If a field expressed a timestamp, whether it was dark outside at that time or whether it was raining at that time may be relevant for pattern recognition. If a field expresses a physical location, the political landscape around that location may be relevant for pattern recognition. Thus, a contextual cue may take various forms based on the purpose of the dataset and the reason for which it is being ingested by a machine-learning model.

Once a contextual cue for a field is detected, some embodiments of the present disclosure may retrieve contextual information based on the cue and add it to the dataset. For example, some embodiments may determine the day of the week on which each date in a dataset falls, whereas other embodiments may determine the weather on that day. Some embodiments may determine whether a time stamp occurred after business hours for a particular day, whereas other embodiments may determine whether it was dark at that timestamp. This information, when added to the dataset, may be particularly useful in correlating recognized patterns with a target phenomenon.

Some embodiments of the present disclosure may also automatically identify fields that should be parsed into numerical values and automatically determine a numerical scheme for those fields. For example, some embodiments may determine a number scheme based on the number of potential variants the values of a field could take (i.e., what are all the possible values that the field could hold). A field with higher potential variants may require a number scheme with a higher number of digits when being parsed. The data type of the field (identified by methods similar to those discussed with respect to identifying contextual cues) may be used to express the potential variants of a field. For example, a field that expresses a state in each entry may have 50 potential variants, even if the dataset only expressed 13 of those variants. A field that expresses blood type, on the other hand, may have 8 variants.

Similarly, some embodiments of the present disclosure may determine the number scheme for parsing a field based on the variance of that field in the dataset. A field with higher variance may also require a number scheme with a higher number of digits when being parsed. Identifying the variance of a field may be useful when the number of potential variants may not be clear based on the form of the field or other information. If, for example, a field may theoretically have millions of potential variants (e.g., based on the number of characters in the field), but the variance in the dataset is very low, a number scheme with a small number of digits may be used when parsing the field.

Some embodiments of the present disclosure may also attempt to determine the function of the data within the dataset. This information may help to determine whether the parsing the field is reasonable. For example, a field that contains a mixture of letters and numbers may be a measurement of wind speed and direction or a street address. If the dataset is known to be a list of crimes reported in a given neighborhood, then the field is more likely to be a street address rather than a wind measurement. Further, because the list is specific to a particular neighborhood, the number of possible addresses may be short enough to parse with a small number of digits (e.g., three digits).

Once a dataset has been flattened, the focus of the dataset has been modified, context has been added to the dataset, and the dataset has been parsed into numerical form, the dataset may be prepared and optimized for digestion by a machine-learning model. In this way, the embodiments of the present disclosure may automatically prepare and optimize datasets for training of and analysis by ML models.

FIG. 1 depicts an example method 100 of preparing a dataset field for ingestion into a machine-learning model, in accordance with embodiments of the present disclosure. Method 100 may be performed by a computer system, such as computer system 800, that has been configured to automatically prepare and optimize a dataset for analysis by a machine learning model.

In block 102, the nested structure of the dataset is flattened. For example, is a dataset is received in JSON format, it may contain a category field "address" under which "street," "city," "state," and "zip code" fields are nested. This category could be flattened by copying the category field into the most specific fields. This may result in the five fields "address: street," "address: city," "address: state," and "address: zip code." Other methods of flattening data are possible. The particular method by which data is flattened may depend on the form in which the dataset is received, the type of machine-learning model into which the data is being input, and others. In some embodiments, a dataset may be flattened by a third-party service before it is received, in which case method 100 may not include block 102.

Once the dataset is flattened, the pattern relevance for the field being prepared is calculated in block 104. As discussed above, "pattern relevance" may refer to a predicted likelihood that a field or set of fields in the dataset could be useful for pattern recognition and correlating recognized patterns with target phenomena. In some embodiments, calculating the pattern relevance for a field may take into account the variance for that field. Fields with particularly low variance (e.g., fields for which every entry in the dataset, or almost every entry, shares the same value), for example, may not contribute patterns that are helpfully correlated with a target phenomenon, because every entry (or almost every entry) would share the value, regardless of whether that entry is positively related to the target phenomenon. To illustrate, a field that kept track of whether the sun rose in the east at the equator on a particular day would not be helpfully correlated with whether it rained at the equator on that particular day (i.e., the target phenomenon), because the sun rises in the east at the equator on every day that it rains and every day that it does not rain.

On the other hand, fields with particularly high variance (e.g., fields for which no two entries in the dataset share the same value, or for which a very small percentage of entries share the same value) may sometimes contribute to helpful patterns, but may sometimes be very unlikely to contribute to helpful patterns. For example, fields for which no two entries in the dataset share the same value may not contribute patterns that are helpfully correlated with a target phenomenon because it may not be possible to form a pattern between the values of the fields. Further, inclusion of these fields in the dataset that is ultimately input into a machine-learning model may actually have negative consequences. Fields unrelated to helpful patterns can, for example, cause a model to be less likely to identify helpful patterns because the patterns may be obscured by the extraneous information. Even when the model is able to identify the helpful patterns, it may take more time and resources to do so, increasing operational cost of the model. Both of these scenarios may be referred to as creating "noise" to the model.

However, in some instances further analyzing high-variance fields may identify helpful patterns even if the exact values of the fields do not. For example, a field in which phone numbers are provided may have 100% variance (i.e., no two entries would share the same phone number). However, when analyzing the area codes of those phone numbers (a portion of a field) in a database of phone calls, a strong pattern between the area code of a phone number and its likelihood of being involved in a fraudulent phone call (a target phenomenon) may be identified.

Further, some embodiments of calculating the pattern relevance in 104 may include determining whether the field is somehow linked to another field in some entries of the dataset. As previously discussed, one field may be linked to another field if a pattern between the values of those two fields is detected. For example, in some datasets the value of a first field may be exactly 30% larger than the value of a second field in 15% of entries. In some datasets, the value of a first field may always be "blue" when the value of a second field is "34." Further, in some datasets, the value of a first field may always equal the value of a second field. In some embodiments, the patterns or interactions between these linked fields may themselves form patterns that may be correlated with a target phenomenon, and thus may have a high pattern relevance.

In some embodiments, calculating the pattern relevance may include analyzing aspects of the dataset in addition to the fields and values within the dataset. For example, a system performing method 100 may have access to metadata associated with the dataset, or communications in which the dataset was received. For example, determining the purpose or origin of the dataset may provide information pertaining to the pattern relevance of some fields in the dataset. A field that appears to express a date, for example, may actually express a unique user ID. If each entry with the field also contains a field that expresses a username and real name, the unique user ID may be completely redundant. In some instances, this information may be available from database metadata or a description of the database found in a file with which the database was delivered.

In block 106, a system performing method 100 determines whether a focus modification is implicated based on the pattern relevance for the field. This may consider, for example, whether the pattern relevance for the field implies that the field is redundant with another field or linked to another field. This may also consider whether the field has moderate variance or high variance, and others. For example, some embodiments of the present disclosure may utilize a feature-selection algorithm, such as a filter-based algorithm (e.g., chi-squared analysis) or a wrapper-based algorithm (e.g., recursive feature elimination) when determining whether a focus modification is implicated. This feature-selection algorithm may consider whether fields have high or low variance and how related the fields appear to be to other fields in the dataset (including, for example, whether the fields of some entries exhibit a linking relationship).

If the system determines, in block 106, that a focus modification is not implicated, the system proceeds to block 110. If, however, the system determines that a focus modification is implicated, the system modifies the dataset focus in block 108 based on the pattern relevance calculated in block 104. The nature of this modification may depend on the pattern relevance that was calculated in block 104 and, relatedly, the reason why a focus modification was implicated in block 106. For example, if the pattern relevance reflects that the field has very low variance, the modification implicated may include deleting the field from the dataset. In that case, the field may be deleted at block 108. If, on the other hand, the pattern relevance reflects that the field is linked with another field, the modification implicated may include merging the linked fields or adding a new field to the dataset to express the linked relationship (e.g., whether the fields express the relationship for each particular entry). In these cases, the modification at block 108 may merge or add the fields accordingly. Modifying the dataset focus is further detailed in FIGS. 2, 3A, and 3B.

After the focus of the dataset is modified in block 108, the system proceeds to block 110 to determine whether a contextual cue is detected in the field. In other words, the system analyzes the field to determine whether contextual information related to the field may be available and may be of use in associating patterns with a target phenomenon. For example, the system may identify the data type of the field and determine whether further information could be derived from values of that data type. These values may not be explicitly stated by the data set, but may still be useful to a machine-learning model analyzing the data set.

For example, if the system determines that a field expresses a date, it may also determine that from that date, the system could identify the day of the week on which the date fell by analyzing a calendar. The system could also query a whether almanac to determine what the weather was like on that day. The type of added information that may be relevant enough to be considered a contextual cue may vary based on the use case. For example, for a dataset with entries describing the locations, times, and dates of crimes, the time may provide a contextual cue, because the angle of the sun at that time may be used to determine whether that location was in sunlight or shadow. However, for a dataset with entries describing the locations, times, and dates of financial transactions, the date may provide a contextual cue, because the calendar date could be used to determine whether the transaction occurred on a bank holiday.

If a contextual cue is not detected in block 110, the system proceeds to block 116. If, however, a contextual cue is detected, the system proceeds to retrieve the related contextual information at block 112. How the contextual information is retrieved may depend based on the contextual cue detected in block 110. As previously discussed, the system may analyze a calendar to determine the day of week on which a date fell or whether that date is a holiday. The system may also query a business' website to determine whether a business was open at a particular timestamp. The system may query weather data to determine temperatures on particular dates or at particular locations. Various methods of retrieving contextual information may be possible; the retrieval of block 112 may be performed by any such methods otherwise consistent with the spirit of this disclosure.

Once the contextual information is retrieved in block 112, the system adds the contextual information to the dataset in block 114. In some embodiments this may involve adding a field to the dataset and adding contextual information for every entry for which the information is available. In some embodiments, the contextual information may be added in the form of a number that the machine-learning algorithm is capable of digesting. In these embodiments, the system may track the added fields and the translation of those numbers to the originating context that they provide.

For example, a system that is preparing a data set of medical-insurance claims to be analyzed to detect fraud may, in block 112, determine the states with the highest rates of insurance fraud. In block 114, this information may be incorporated into one or new fields that expresses whether the insurance claim occurred in one of those states. For each entry, a "1" could be added to the field if the associated insurance claim occurred in one of those states, and a "0" could be added to the field if it did not. In this example, the system may also choose to delete pre-existing dataset fields that express the precise state in which the transaction occurred (for example, by repeating blocks 106 and 108, or performing blocks 110-114 before block 106 and 108). This may be beneficial in instances in which the system determines in block 112 that all states except those high-fraud-rate states have a very low fraud rate. Thus, the precise state in which a claim occurred may not be relevant; only whether the claim occurred in a high-fraud-rate state may be relevant. The process of adding contextual information is detailed further in FIGS. 4, 5A, and 5B.

After the system adds the contextual information in block 114, the system proceeds to block 116 to determine whether the field is reasonably parseable into numerical format. This may be beneficial for machine-learning models that are only capable of analyzing numerical data. In some embodiments, this determination may include determining a data type held by the field (e.g., date, time stamp, job title) and analyzing whether the data type has a distinct set of potential variants. For example, a field that expresses the month of the year in words would have twelve potential variants, even if no entry in the dataset expressed "October" in the field. Thus, a system might determine that such a field is easily parseable by replacing each month with a number 01-12. However, a field that provides a first name may contain millions of potential variants, and thus the number of potential variants may not, by themselves, make the field reasonably parseable.

In some embodiments, on the other hand, the system may consider other aspects of the dataset to determine whether the field is reasonably parseable with a number scheme comprising two digits. For example, even though a field containing a first name may have millions of potential variants, the system may realize that the dataset is only 1000 entries long, and once deployed the machine-learning model may only review 9000 entries. In this example, the system may replace the "First Name" field of each entry with a unique 4-digit number (e.g., between 0000 and 9999), taking note of the name that each entry number corresponded to.

If the system determines in block 116 that a field is not reasonable parseable, it proceeds to block 120, in which method 100 ends with respect to the field. If the system is unable to parse a field, the system may simply leave it in the dataset or delete it, depending on the needs of the machine-learning model. If, on the other hand, the system determines that a field is reasonably parseable, the system proceeds to parse the field in block 118. This parsing is sometimes referred to as "encoding categorical variables" or "encoding categorical features," and may take the form of converting the value of the field to a numerical format determined by an appropriate numerical schema. For example, in the month example discussed above, the numerical schema would assign each month to a 2-digit number between 01 and 12, and replace each value in each entry with a corresponding number. In the first-name example, the numerical schema would assign each value in each entry a unique number between 0000 and 9999, and replace the values accordingly (for example, in ascending order). Once the field is parsed in block 118, method 100 ends with respect to that field in block 120. Further detail pertaining to parsing a field is discussed in FIGS. 6, 7A, and 7B.

If the dataset contains further fields to be prepared and optimized after block 120, method 100 may restart at block 104 with respect to those fields. Alternatively, the dataset may be completely prepped and optimized for ingestion by a machine-learning model after block 120.

Figure 2:
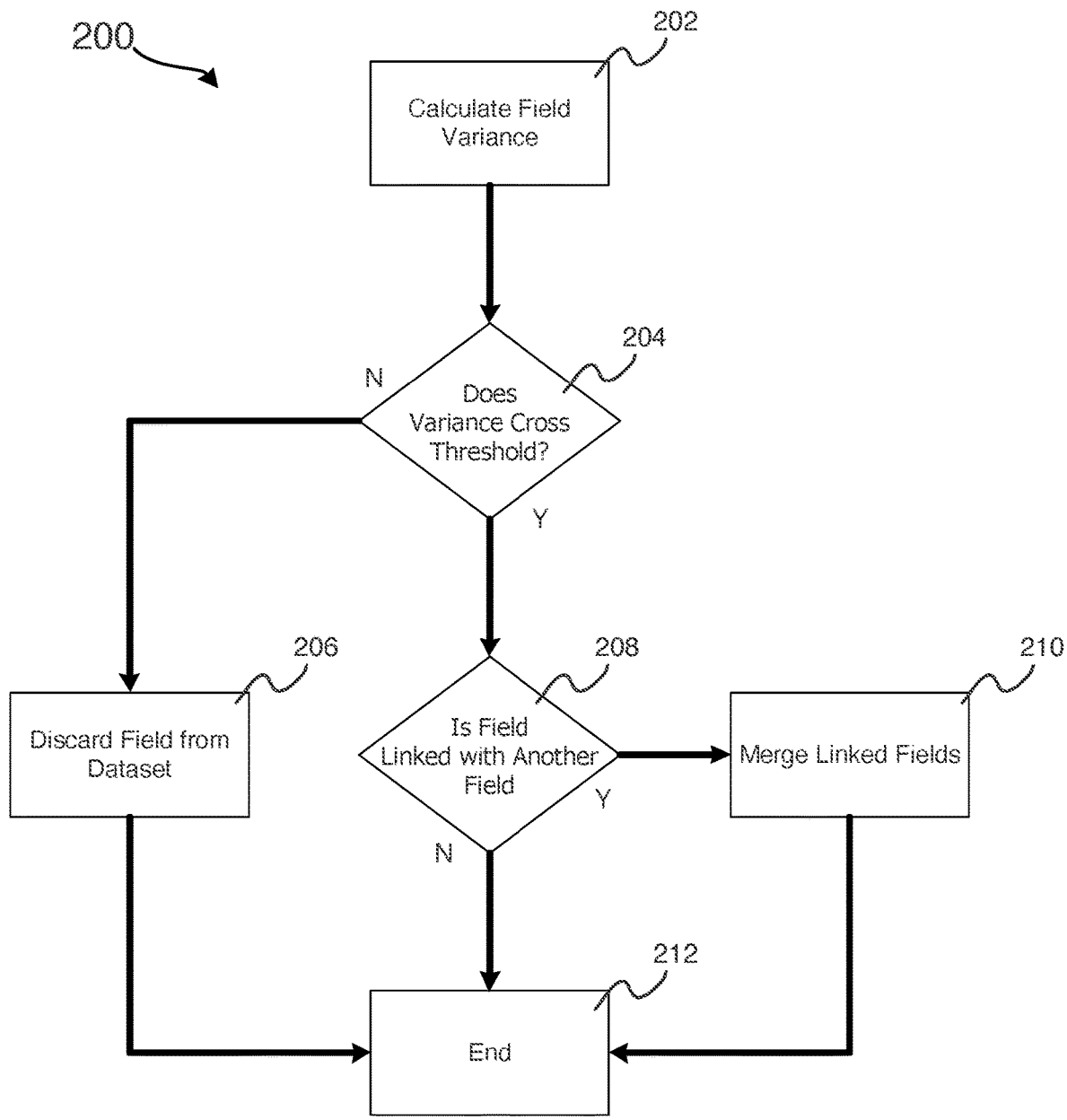
FIG. 2 depicts an example method of modifying the focus of a dataset based on a pattern relevance of one or more dataset fields, in accordance with the embodiments of the present disclosure.

FIG. 2 depicts an example method 200 of modifying the focus of a dataset based on a pattern relevance of one or more dataset fields, in accordance with the embodiments of the present disclosure. It is important to note that the processes performed as part of method 200 are intended only to be illustrative examples. As such, they may be beneficial in some datasets, but detrimental in others. As discussed throughout this disclosure, a system performing the methods of this disclosure would beneficially customize those methods to the properties of the dataset. Procedures for this customization are discussed throughout the disclosure. Method 200 may be performed by a computer system, such as computer system 800, that has been configured to automatically prepare and optimize a dataset for analysis by a machine learning model.

Method 200 begins with block 202, in which the system calculates the variance of a field of the dataset. The system may calculate a field variance, for example, by first identifying the value for the field in each entry in the data set. Then, for each entry, the system may determine the number of other entries that share that value for the field, and divide that number by the total number of entries in the dataset. This would provide a similarity number for each entry. Those similarity numbers could then be added together, the sum of which could then be divided by the total number of entries in the data set to obtain an average similarity value. The average similarity value could then be inversed (i.e., 1 could be divided by the average similarity value) to calculate the variance for the field.

After the variance is calculated for the field in block 202, the system compares the variance to a variance threshold in block 204. In some embodiments, this variance threshold may take the form of a low-variance threshold. In these embodiments, the calculated variance may cross the variance threshold if it is greater than the threshold. This may be beneficial, for example, to eliminate fields that have insufficient variance to be likely to pertain to patterns that are correlated with a target phenomenon. In some embodiments, this variance threshold may also take the form of a high-variance threshold. In these embodiments, the calculated variance may cross the threshold if it is less than the threshold. This may be beneficial, for example, to eliminate fields that have so high of variance that no patterns are likely to be recognized. In embodiments with a high-variance threshold, the system may also analyze fields that do not cross the threshold in order to determine whether any other field properties may cause the field to be more likely to pertain to relevant patterns before discarding the field.

Some embodiments of the present disclosure may include a more complicated analysis than comparing a variance to a variance threshold. For example, in some embodiments block 204 may be replaced with a complex feature-selection algorithm that considers variance and other factors, such as an expression of expected field values and actual field values and an expression of how related the values may be to the values of other entries (or other fields) in the dataset.

If the system determines in block 204 that the variance does not cross the threshold, the system discards the field from the dataset in block 206 and ends method 200 with respect to the field in block 212. If, however, the system determines that the variance does cross the variance threshold, the system proceeds to block 208 in which case the system determines whether the field is linked with another field. For example, the system may determine that a field is linked with another field if the values of the fields are always equal for a given entry, or if value of one field of a given can be calculated using one or more fields of the entry. However, not all entries may exhibit the linking pattern in order for a field to be linked with another field. For example, a first field may be considered linked with a second field in the entry if the value of that first field is always "250" when the value of the second field is "T." This linked relationship may hold true even if the value of the first field may be seemingly random for all entries for which the value of the second field is not "T." In other words, the linking pattern may only be evident for entries for which the value of the second field is "T," but the fields may still be considered to be linked.

If the field is not determined to be linked with another field in block 208, the system proceeds to block 212, in which method 200 ends with respect to the field. However, if the field is determined to be linked with another field, the system proceeds to block 210, in which the linked fields are merged. This may be beneficial, for example, for datasets in which all entries exhibit the linking relationship. However, in datasets in which some entries do not exhibit the linking relationship, block 210 may add a field to the dataset that expresses whether the linking relationship is present for that entry, and may not merge any fields.

After the system merges the linked fields in block 210, the system proceeds to block 212, in which method 200 ends with respect to the field.

Figure 3A:
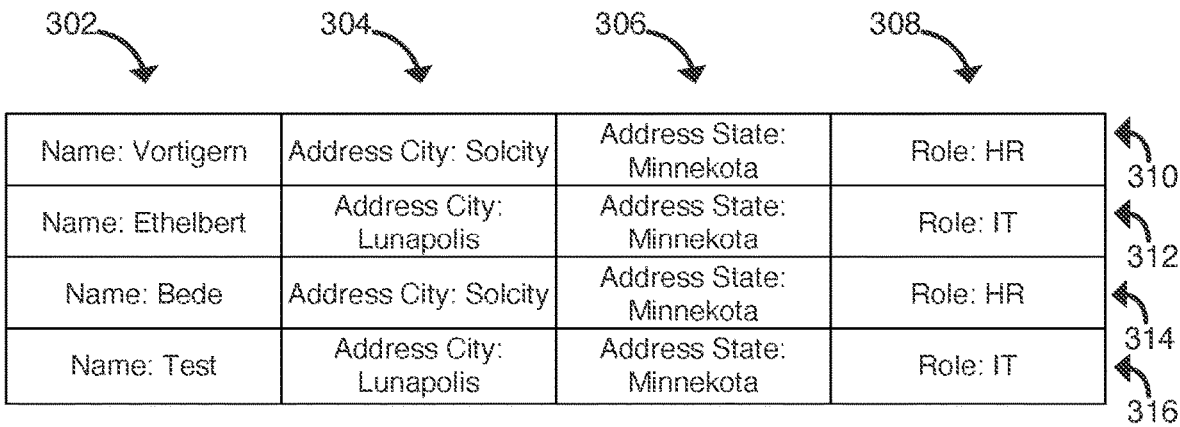
FIG. 3A depicts an example dataset sample prior to undergoing a focus modification, in accordance with embodiments of the present disclosure.
Figure 3B:
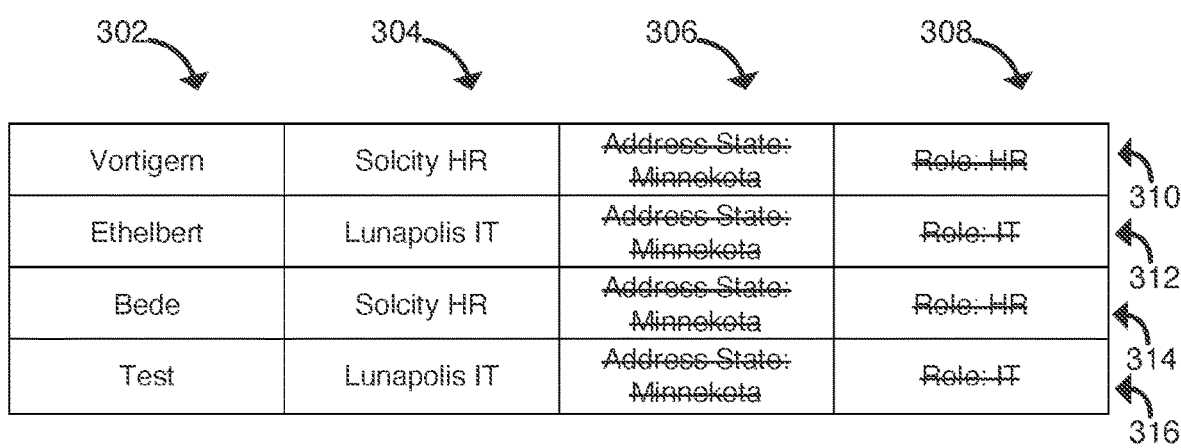
FIG. 3B depicts the example dataset sample after undergoing a focus modification, in accordance with embodiments of the present disclosure.

FIGS. 3A and 3B depict an example dataset 300 before and after undergoing a focus modification, in accordance with embodiments of the present disclosure. FIG. 3A depicts dataset 300 prior to undergoing the focus modification. Dataset 300 contains fields 302, 304, 306, and 308 for dataset entries 310, 312, 314, and 316. As illustrated, dataset 300 is presented in a row-and-column format. However, that is solely for the sake of understanding. In some embodiments, dataset 300 would have already been flattened, and entries 310 through 316 may take the form of individual vectors, rather than rows in a table.

Dataset 300 may, for example, contain data belonging to a company and track employee directory information. Each entry 310 through 316 may provide data for a particular employee. Field 302, for example, contains the employee's name. Field 302 also contains the character string "Name:", which may have been a label in the database format (e.g., JSON) before it was flattened. Field 304 contains the city in which the employee works, whereas field 306 contains the state in which the employee works. Fields 304 and 306 contain the word "Address," which may have been a category label in the database format before it was flattened. For example, the label "Address:" may have been displayed on a first line, and below that line the label "City:" and value "Solcity" (for entry 310, for example) may have been displayed. Below that line, the label "State:" and value "Minnekota" may have been displayed. Field 308 contains the role that the employee holds in the company.

FIG. 3B depicts the example dataset 300 after undergoing a focus modification. For example, a system that is preparing and optimizing dataset 300 may have recognized the address string "Name:" in field 302 as a data label because it occurs at the beginning of all values in the field and is followed by a colon and varying data. Thus, the system altered field 302 by eliminating the data label. The system has also deleted the "Address City:" label from field 304 for the same reason.

The system may have also analyzed fields 304 and 308 and determined a linked relationship between the two fields. Specifically, when the value of field 304 was "Address City: Solcity" in FIG. 3A, the value of field 308 was always "Role: HR," and vice versa. Similarly, when the value of field 304 was "Address City: Lunapolis" in FIG. 3A, the value of field 308 was always "Role: IT," and vice versa. For this reason, the system has merged fields 304 and 308 into field 304, and deleted the redundant 308.

Similarly, the system may have calculated the variance of field 302 as 0% (or 0, or "null"), and determined, therefore that the values of field 306 would not contribute to any patterns that would be correlated with a target phenomenon. Thus, the system has eliminated field 306.

Finally, though not here illustrated, in some embodiments the system could analyze the names expressed in field 302 and measure the variance of 100%. In some such embodiments, the system may remove field 302 as a result. In similar embodiments, the system may analyze the names expressed in field 302 and identify "test" as unlikely to be an employee name. If the system is able to perform natural language processing on a communication with which dataset 300 was received, the system may also realize that some test data exists in the database, and should not be analyzed. In these embodiments, the system may remove entry 316 from the dataset.

Figure 4:
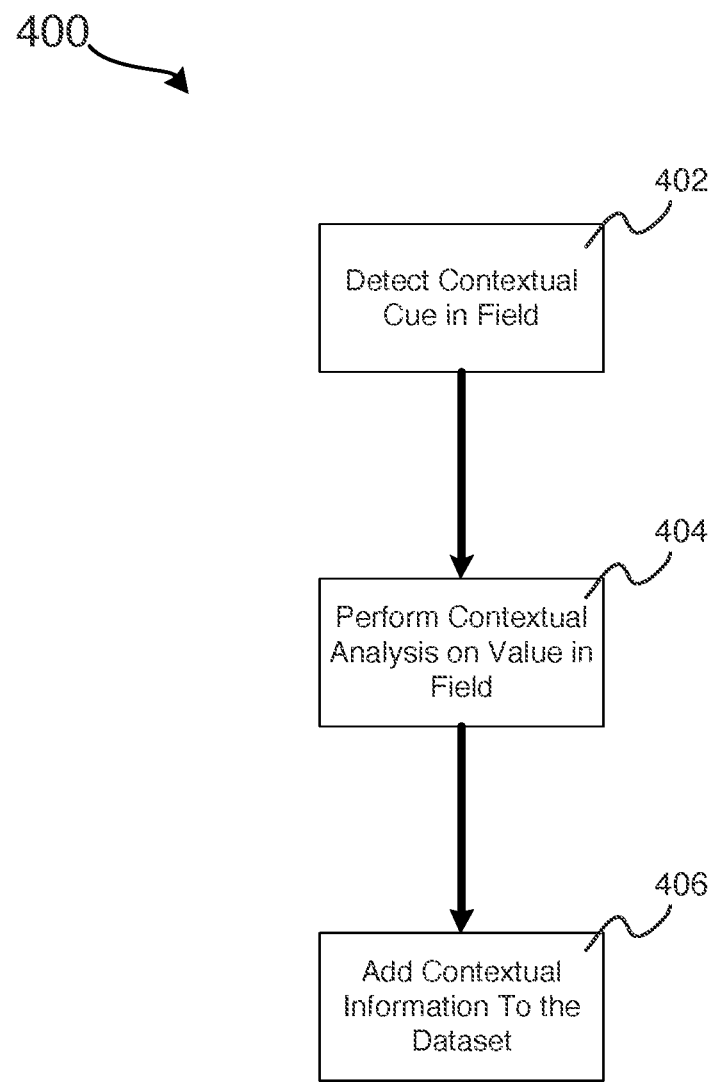
FIG. 4 depicts an example method of adding contextual information to a dataset, in accordance with embodiments of the present disclosure.

FIG. 4 depicts an example method 400 of adding contextual information to a dataset, in accordance with embodiments of the present disclosure. Method 400 may be performed by a computer system, such as computer system 800, that has been configured to automatically prepare and optimize a dataset for analysis by a machine learning model. Method 400 begins with block 402, in which a system performing method 400 detects a contextual cue in the field. Block 403 may include, for example, determining the data type in a field and analyzing whether that data type is likely to be a candidate for having related contextual information that may be correlated with a target phenomenon. For example, a timestamp in a dataset that reports criminal incidents may contain a contextual cue: whether that timestamp occurred before or after sunset. Similarly, a field that provides the dollar amount of a transaction may contain a contextual cue: whether the dollar amount is significantly higher or lower than the dollar amount of similar transactions. As discussed previously, the precise methods of determining whether a contextual cue is present may vary based on the data within the dataset. Thus, the system may also attempt to identify the function of the field in the dataset. For example, a field that provides a social security number may provide different context than a field providing a bank-account balance, even if the values of those fields may be expressed in the same format in some datasets (e.g., a series of 9 numbers).

Once a contextual cue is detected in the field in block 402, the system proceeds to perform contextual analysis on the value in the field in block 404. For example, depending on the contextual cue, the system may query an internet-connected source for further information on the value (e.g., "what day of the week was X date"), or may analyze the field using other methods, such as scanning an available corpus of documents for information related to the value (e.g., a second database of transaction receipts).

Once the system performs contextual analysis on the field in block 404, the system adds the contextual information derived from the analysis to the dataset in block 406. This may take the form, in some embodiments, of adding a field to the dataset to provide the information. In other embodiments, this may take the form of including the information in the field in which the contextual cue was detected.

Figures 5A, 5B:
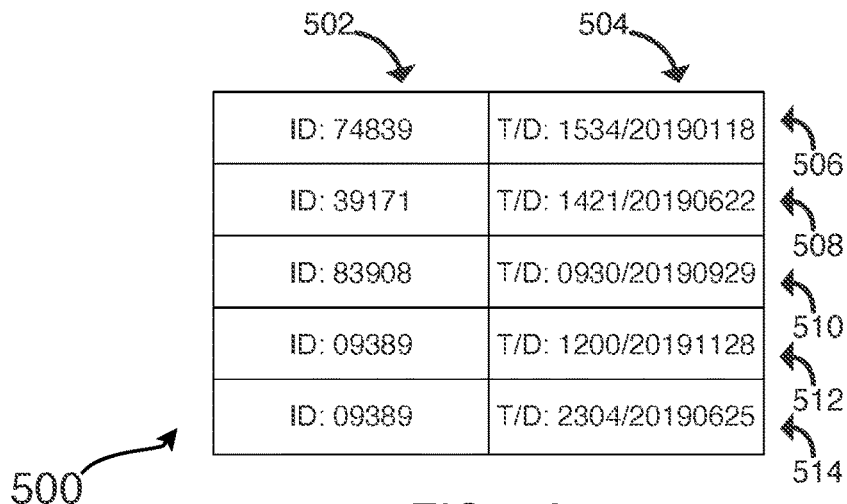
FIG. 5A depicts an example dataset sample prior to the addition of contextual information to the dataset.
FIG. 5B depicts the example dataset sample after the addition of contextual information to the dataset.

FIGS. 5A and 5B depict an example dataset 500 before and after an addition of contextual information, in accordance with embodiments of the present disclosure. FIG. 5A depicts dataset 500 prior to undergoing the focus modification. Dataset 500 contains fields 502 and 504 for dataset entries 506, 508, 510, 512, and 514. Similar to dataset 300, dataset 500 is presented in a row-and-column format. However, that is solely for the sake of understanding. In some embodiments, dataset 500 would have already been flattened, and entries 506 through 514 may take the form of individual vectors, rather than rows in a table.

Dataset 500 may, for example, be part of a log of transaction records. Each of entries 506 through 514 may contain data pertaining to an individual transaction, such as a financial transaction (e.g., a transfer of money) or an insurance claim. In this example, the dataset may be used to train a machine-learning model to recognize and associate patterns within a transaction record with fraudulent activity.

Field 502 contains transaction IDs, as well as the character string "ID:" preceding each transaction ID. Field 504 contains a timestamp and date-stamp pair that corresponds to the time and date each transaction was made. A system that is preparing and optimizing dataset 500 for ingesting into a machine-learning model may attempt to identify contextual cues in both fields 502 and 504. For example, field 502 may, at first, appear to be a zip code because it is a 5-digit number. If that were the case, a system may attempt to locate contextual information for those zip codes at the time and date specified in field 504. However, by analyzing slightly more thoroughly, a system may realize that field 502 contains transaction identifiers. For example, the system may analyze the values in field 502 in their entirety and realize that they are preceded by the same character string: "ID:". The system may conclude that the string "ID:" is a data label applied during the flattening process, and that "ID" stands for "identifier." In some embodiments, this information may also be available through metadata attached to database 500 or other sources.

The system may then analyze field 504 for contextual information, and determine that, in addition to the "T/D:" identifier, field 504 contains time and date stamps. Based on the identifiers in field 502 and metadata associated with database 500, the system may conclude that field 504 expresses timestamps and date stamps of individual financial transactions or of individual medical-insurance claims. Thus, the system may identify contextual cues in field 504 and proceed to search for contextual information related to those cues. Specifically, the system may search for information related to whether the transactions were made at valid times and valid date (e.g., during banking hours, when the applicable medical-provider's office was open).

FIG. 5B depicts the example dataset 500 after the addition of contextual information to the dataset. Specifically, the system has identified the day of the week corresponding to each date on the date stamp and inserted that as a new field in field 516 (underlined for emphasis). Similarly, the system has determined whether each of the dates in field 504 fall on a banking or provider (as applicable) holiday. In some embodiments, both of fields 516 and 518 may provide contextual information that may be helpful when attempting to recognize patterns in dataset 500 that may be correlated to a target phenomenon (e.g., a fraudulent transaction).

For example, the transaction in entry 506 occurred at 3:34 PM on a Friday that was not a holiday, which may not be part of any pattern that may be correlated to a fraudulent transaction. However, the transaction in entry 508 at 2:21 PM on a Saturday, which may be after banking hours or after the medical provider's office closes. Similarly, the transaction in entry 510 occurred on a Sunday, a day on which the bank or medical provider was closed, and the transaction in entry 512 occurred on a Holiday, another day on which the bank or medical provider was closed. Finally, the transaction in entry 514 occurred on a Tuesday that was not a holiday, but occurred at 11:04 PM, hours after the bank or provider closed.

When analyzing financial transactions and insurance claims, a system may recognize a pattern that transactions that occur outside of banking or operating hours may have a significantly higher correlation with fraud then transactions that occur within banking or operating hours. However, before considering contextual information (in other words, in FIG. 5A) the system may have only realized that the transaction in entry 514 was after banking or operating hours, and thus may have only flagged that transaction as likely to be fraudulent. However, by considering the contextual information of the day of the week in field 516 and whether a day is a holiday, the system has also realized that the transactions in entries 508 through 512 also occurred outside of banking or operating hours. Thus, the likelihood that the transactions for those entries are associated with fraud may be more accurately determined.

Once the contextual information is added in FIG. 5B, a system may further prepare dataset for ingestion into a machine-learning model. For example, the system may perform a method to modify the focus of dataset 500, similar to the method displayed in FIGS. 1 and 2. As part of that method, the system may determine that the strings "ID:" in field 502 and "T/D:" in field 504 are data labels left over from the data structure in the dataset, and may remove them from the dataset.

Figure 6:
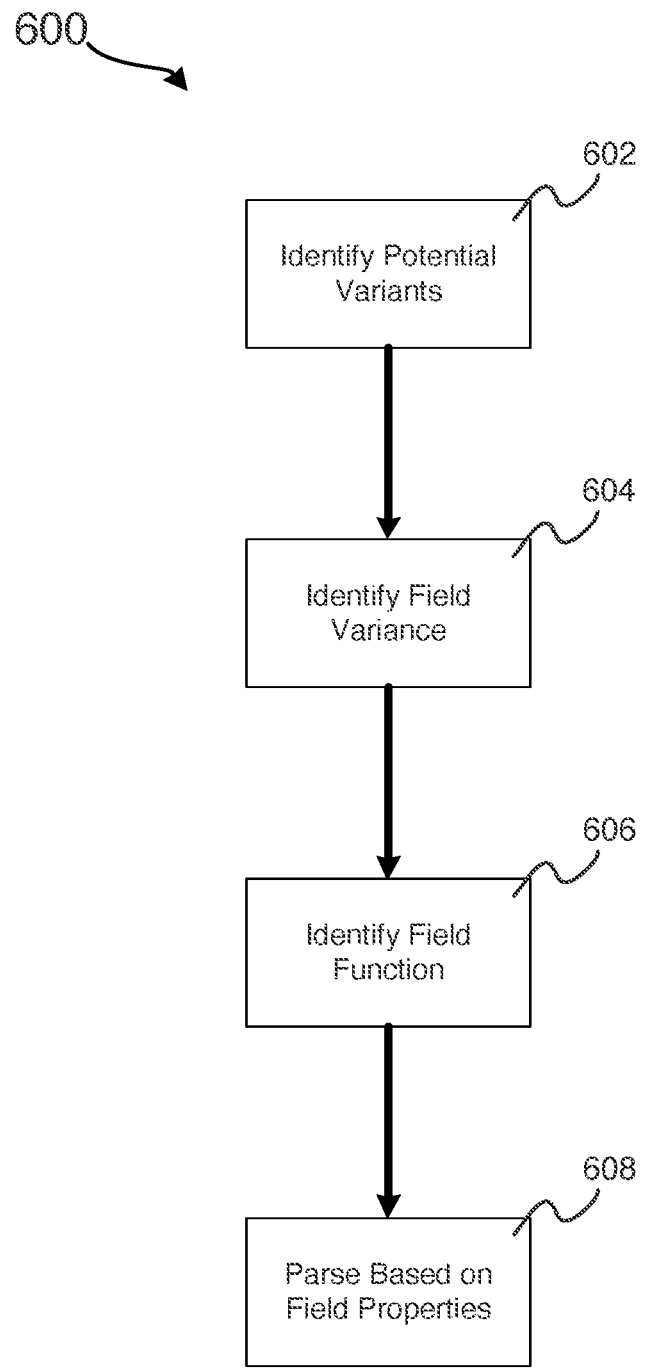
FIG. 6 depicts an example method of parsing a dataset field into numerical form, in accordance with embodiments of the present disclosure.

FIG. 6 depicts an example method 600 of parsing a dataset field into numerical form, in accordance with embodiments of the present disclosure. Method 600 may be performed by a computer system, such as computer system 800, that has been configured to automatically prepare and optimize a dataset for analysis by a machine learning model. Method 600 begins in block 602, in which the system identifies the number of potential variants for the values of the field. As discussed previously, this may involve determining the type of data based, for example, on the data format or the data variety present in the field. For example, a field that has a mixture of numerical and string characters, but always begins with three or four string characters, followed by two numerical digits, a comma, and four more numerical digits may be highly likely to express a date stamp because of the data format. Similarly, a field that contains the values "blue," "green," "hazel," and "brown" may be highly likely to express eye color because of the relative rarity of "hazel" in a list of colors when not describing eyes. In these examples, the system may determine, without further information, that the date-stamp field may have many, many potential variants depending on how far back the date stamps may go. This may imply that a relatively high number of digits (e.g., 7 digits) may be necessary to parse all the potential variants. The system may determine, however, that the eye-color field may only have a small number of potential variants due to the way eye color is typically described. This may imply that a relatively small number of digits (e.g., 1) may be sufficient to parse all the potential variants.

In some embodiments, the number of potential variants may be estimated based on the variety of data in the dataset. For example, if the data set contained 10,000 entries, and every single entry for a particular field was either A or B, the system may conclude with high confidence that there are only two potential variants for the field.

Once the potential variants have been identified in block 602, the system proceeds to identify the field variance in block 604. This may be performed, as previously described, by determining, for each particular entry, how many other entries the particular entry is identical to. This number may then be divided by the total number of entries in the data set, to get a similarity value for that particular entry. The similarity values for all entries in the field may then be added together and the resulting sum may be divided by the total number of entries in the data set. The inverse of this number would express the field variance.

In some instances, a very low field variance may suggest that few digits would be necessary to parse the field into numerical form. For example, in a dataset with 1,000 entries, if all but 15 entries contain "A" in the field, the system may conclude that the variance in the present and future datasets is likely to be so low that almost all data for the field will be identical, and that, therefore, few other unique values will be discovered.

After the system has determined the field variance in block 604, the system determines the function of the field in block 606. In some embodiments, this may require contextual knowledge of a data set. For example, if a dataset is a list of medical records, a field of colors may be hair color, which may be possible to parse with relatively few digits (similar to eye color above). However, if a dataset is instead a compilation of product offerings, a list of colors could have a very large number of digits, and thus may be impossible to parse without a relatively large number of digits. Similarly, a list of addresses within a national database may require a very large number of digits to parse, whereas a list of digits in a small neighborhood may require a small number of digits to parse.

Once the system has determined the function of the field in block 606, the system parses the field into numerical format in block 608 based on the properties identified in blocks 602 through 606. For example, identifying a relatively high number of potential variants in a field in block 602 may suggest that a numerical schema with a large number of digits may be necessary to parse the field. However, identifying a very low variance for the field in block 604 may suggest that the variants in the present and future dataset may remain low. This would suggest that a numerical schema with a low number of digits may be necessary to parse the field. Finally, determining in block 606 that the field may only apply to a very small fraction of the identified number of potential variants in block 602 may imply that a lower number of digits may be necessary to parse the field than block 602 originally suggested. Once a numerical scheme is determined, the system parses the field according to the numerical scheme in block 608.

Figure 7A:
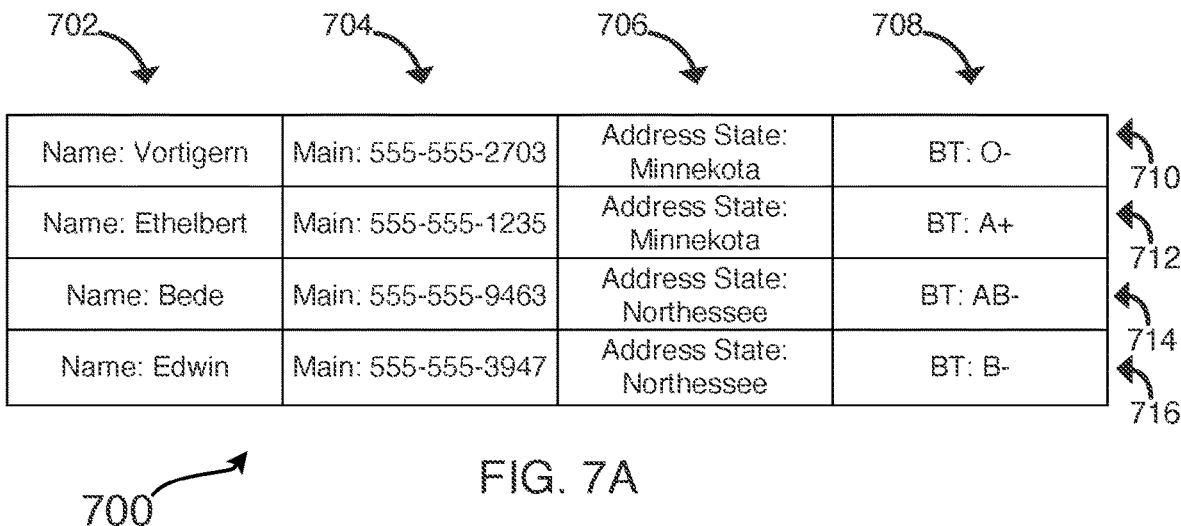
FIG. 7A depicts an example dataset sample prior to being parsed into numerical form, in accordance with embodiments of the present disclosure.
Figure 7B:
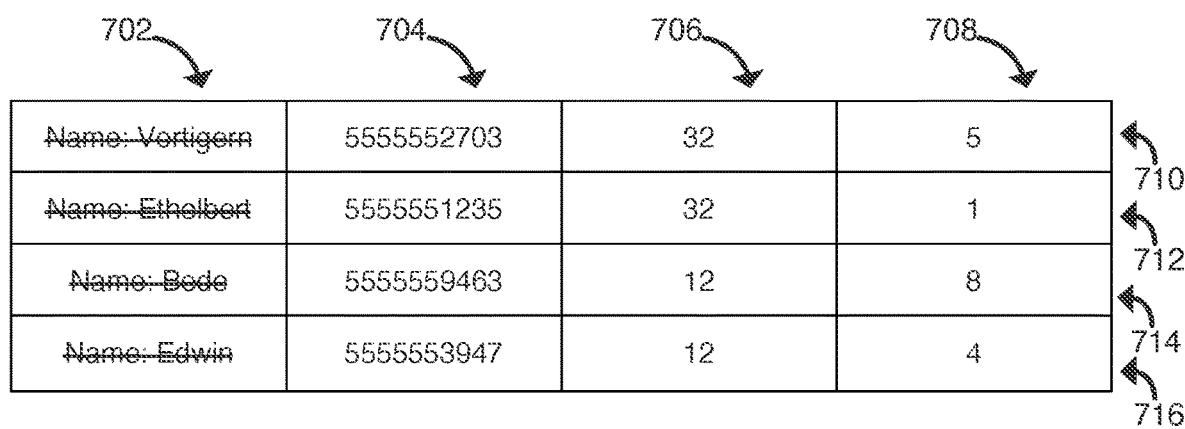
FIG. 7B depicts the example dataset sample after being parsed into numerical form, in accordance with embodiments of the present disclosure.

FIGS. 7A and 7B depict an example dataset 700 before and after being parsed into numerical format, in accordance with embodiments of the present disclosure. FIG. 7A depicts dataset 700 prior to being parsed into numerical form. Dataset 700 contains fields 702, 704, 706, and 708 for dataset entries 710, 712, 714, and 716. Similar to datasets 300 and 500, dataset 700 is presented in a row-and-column format. However, that is solely for the sake of understanding. In some embodiments, dataset 700 would have already been flattened, and entries 710 through 716 may take the form of individual vectors, rather than rows in a table.

Dataset 700 may, for example, contain medical records of a hospital, doctor's office, insurance company, or the like. Each entry 710 through 716 may contain data for a particular patient. Field 702, for example, contains the patient's name, and field 704 contains the patient's phone number. Field 706 contains the patient's home state, and field 708 contains the patient's blood type.

FIG. 7B depicts dataset 700 after being parsed into numerical form. For example, a system that is preparing and optimizing dataset 700 may have analyzed field 704 and recognized that the field contains phone number with a data label ("Main:") and hyphen formatting. The system may, therefore, have removed the non-numerical characters. In some embodiments, the system may also determine that, because phone numbers are likely to be largely unique throughout the entries, the variance of field 704 may be high enough to have a very low pattern relevance. However, the area codes of the phone numbers (i.e., the first three digits) may have a more moderate variance and may therefore express patterns that may be correlated with a target phenomenon. Thus, in some embodiments, the system may also shorten the values of field 704 to keep only the phone numbers.

When analyzing field 702, the system may calculate, based on the high variance, that parsing the field may be difficult. Further, the system may also determine, based on the "Name:" data label, that the values of the field are names. Because proper names can have a very large number of potential variants, the system may determine that field 702 is not reasonably parseable. In some embodiments, this may require field 702 to be deleted from database 700 so all fields in database 700 are numerically expressed.

When analyzing field 706, the system may originally calculate the field variance at 50%, and so may initially determine that only two numbers may be necessary to parse field 706 numerically. However, the system may also determine, based on the "Address State:" data label, that the values of field 706 are all states. Thus, the system may determine that field 706 may have 50 potential variants, and therefore may parse the values of field 706 according to a 50-number (2-digit) number scheme rather than a 2-number (1-digit) number scheme. Thus, the system may assign each of the 50 states a number, and parse field 706 accordingly.

Using a 50-number number scheme may be beneficial in the case that future entries in the dataset (for example, when the machine-learning model is deployed) contain other states in field 706.

Further, encoding the address state in a 50-digit number scheme may also enable some contextual information to be encoded in the state field as well. For example, if the system is reviewing a set of personal records to identify individuals who are falsely claiming government benefits, the system may a list of states that is ordered based on the rate of benefits fraud in that state (for example, the state with the highest fraud rate would be "01," state with the second-highest fraud rate would be "02," etc.). Thus, encoding "Minnekota" as "32" may both be used to express in what state, for example, Vortigern resides, but also the fraud rate of the state in which Vortigern resides.

When analyzing field 708, the system may determine that the variance is 100%, and thus may originally determine that field 708 may not be reasonably parseable. However, the system may also determine, based on the data label "BT:", based on the fact that the entries to database 700 are medical records, and based on the fact that the values of field 708 all are identical to blood types, the system may determine that all entries of field 708 contain blood types. Thus, the system may also determine that field 708 only has 8 potential variants, and thus could be passed with a numerical scheme with 8 numbers (1-digit). Thus, the system may assign each of the 8 blood types a number, and parse field 708 accordingly.

Figure 8:
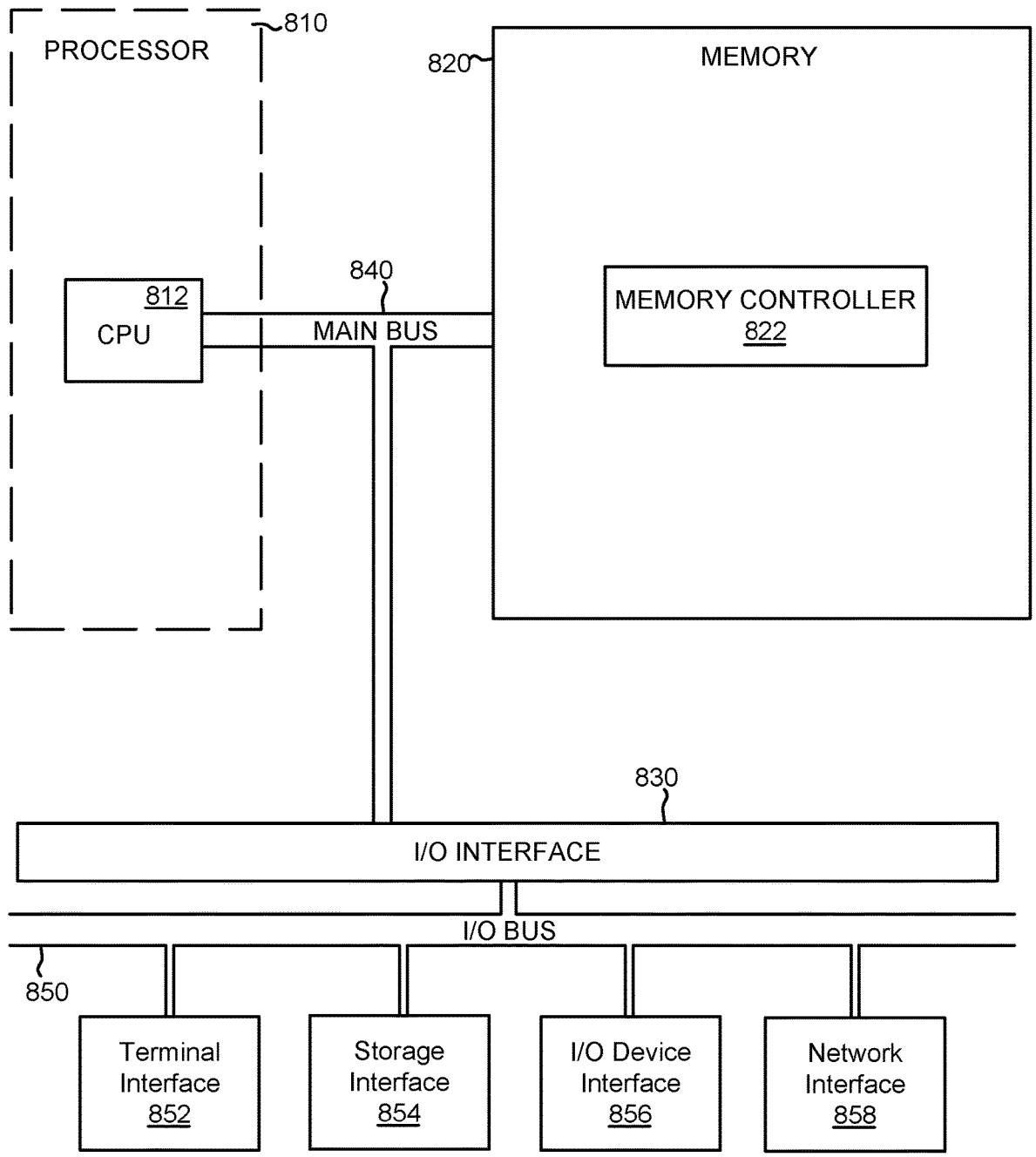
FIG. 8 depicts the representative major components of a computer system that may be used in accordance with embodiments.

FIG. 8 depicts the representative major components of an example Computer System 801 that may be used in accordance with embodiments of the present disclosure. The particular components depicted are presented for the purpose of example only and are not necessarily the only such variations. The Computer System 801 may include a Processor 810, Memory 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may include one or more CPUs 812. The Processor 810 may additionally include one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may include one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may include a Memory Controller 822 and one or more memory modules for temporarily or permanently storing data (not depicted). In some embodiments, the Memory 820 may include a random-access semiconductor memory, storage device, or storage medium (either volatile or non-volatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may include an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may include the Terminal Interface 852, the Storage Interface 854, the I/O Device Interface 856, and the Network Interface 858. In some embodiments, the various interfaces may include a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of preparing a dataset for ingestion by a machine-learning model, the method comprising:
    calculating a pattern relevance for a first field in the dataset;
    modifying the first field based on the pattern relevance;
    detecting a contextual cue in the first field;
    retrieving contextual information for a value in the first field;
    adding the contextual information to the dataset;
    identifying a numerical scheme for the first field; and
    parsing the first field into a number according to the numerical scheme.

2. The method of claim 1, wherein calculating the pattern relevance comprises:
    calculating a variance for the first field; and
    comparing the variance to a variance threshold, wherein the modifying is based on the comparison.

3. The method of claim 2, wherein the modifying comprises removing the first field from the data set.

4. The method of claim 1, wherein calculating the pattern relevance comprises determining that the first field is linked with a second field in the dataset, wherein the modifying includes merging the linked fields.

5. The method of claim 1, wherein calculating the pattern relevance comprises determining that the first field is linked with a second field in the dataset, wherein the modifying includes adding a third field to the dataset that expresses the linked relationship.

6. The method of claim 1, wherein calculating the pattern relevance comprises performing natural-language processing on communications associated with the dataset.

7. The method of claim 1, further comprising determining a number of potential variants for the first field, wherein the numerical scheme is based on the number of potential variants.

8. The method of claim 1, wherein the contextual cue is a likelihood that contextual information related to the first field may be available and may be of use in associating patterns in the dataset with a target phenomenon.

9. The method of claim 1, wherein adding the contextual information to the dataset comprises adding a fourth field to the dataset that contains the contextual information.

10. A system comprising:
a processor; and
a memory in communication with the processor, the memory containing program instructions that, when executed by the processor, are configured to cause the processor to perform a method of preparing a dataset for ingestion by a machine-learning model, the method comprising:
calculating a pattern relevance for a first field in the dataset;
modifying the first field based on the pattern relevance;
detecting a contextual cue in the first field;
retrieving contextual information for a value in the first field;
adding the contextual information to the dataset;
identifying a numerical scheme for the first field; and
parsing the first field into a number according to the numerical scheme.

11. The system of claim 10, wherein calculating the pattern relevance comprises:
calculating a variance for the first field; and
comparing the variance to a variance threshold, wherein the modifying is based on the comparison.

12. The system of claim 10, wherein calculating the pattern relevance comprises determining that the first field is linked with a second field in the dataset, wherein the modifying includes adding a third field to the dataset that expresses the linked relationship.

13. The system of claim 10, wherein the method further comprises determining a number of potential variants for the first field, and wherein the numerical scheme is based on the number of potential variants.

14. The system of claim 10, wherein the contextual cue is a likelihood that contextual information related to the first field may be available and may be of use in associating patterns in the dataset with a target phenomenon.

15. The system of claim 10, wherein adding the contextual information to the dataset comprises adding a fourth field to the dataset that contains the contextual information.

16. A computer program product, the computer program product comprising a computer readable storage medium having program instructions embodied therewith, the program instructions executable by a computer to cause the computer to:
calculate a pattern relevance for a first field in a dataset;
modify the first field based on the pattern relevance;
detect a contextual cue in the first field;
retrieve contextual information for a value in the first field;
add the contextual information to the dataset;
identify a numerical scheme for the first field; and
parse the first field into a number according to the numerical scheme.

17. The computer program product of claim 16, wherein calculating the pattern relevance comprises:
calculating a variance for the first field; and
comparing the variance to a variance threshold, wherein the modifying is based on the comparison.

18. The computer program product of claim 16, wherein calculating the pattern relevance comprises determining that the first field is linked with a second field in the dataset, wherein the modifying includes adding a third field to the dataset that expresses the linked relationship.

19. The computer program product of claim 16, wherein the program instructions further cause the computer to determine a number of potential variants for the first field, and wherein the numerical scheme is based on the number of potential variants.

20. The computer program product of claim 16, wherein the contextual cue is a likelihood that contextual information related to the first field may be available and may be of use in associating patterns in the dataset with a target phenomenon.

* * * * *